H. S. FIRESTONE.
SIDE WIRE TIRE.
APPLICATION FILED JAN. 30, 1911.
1,058,358.
Patented Apr. 8, 1913.
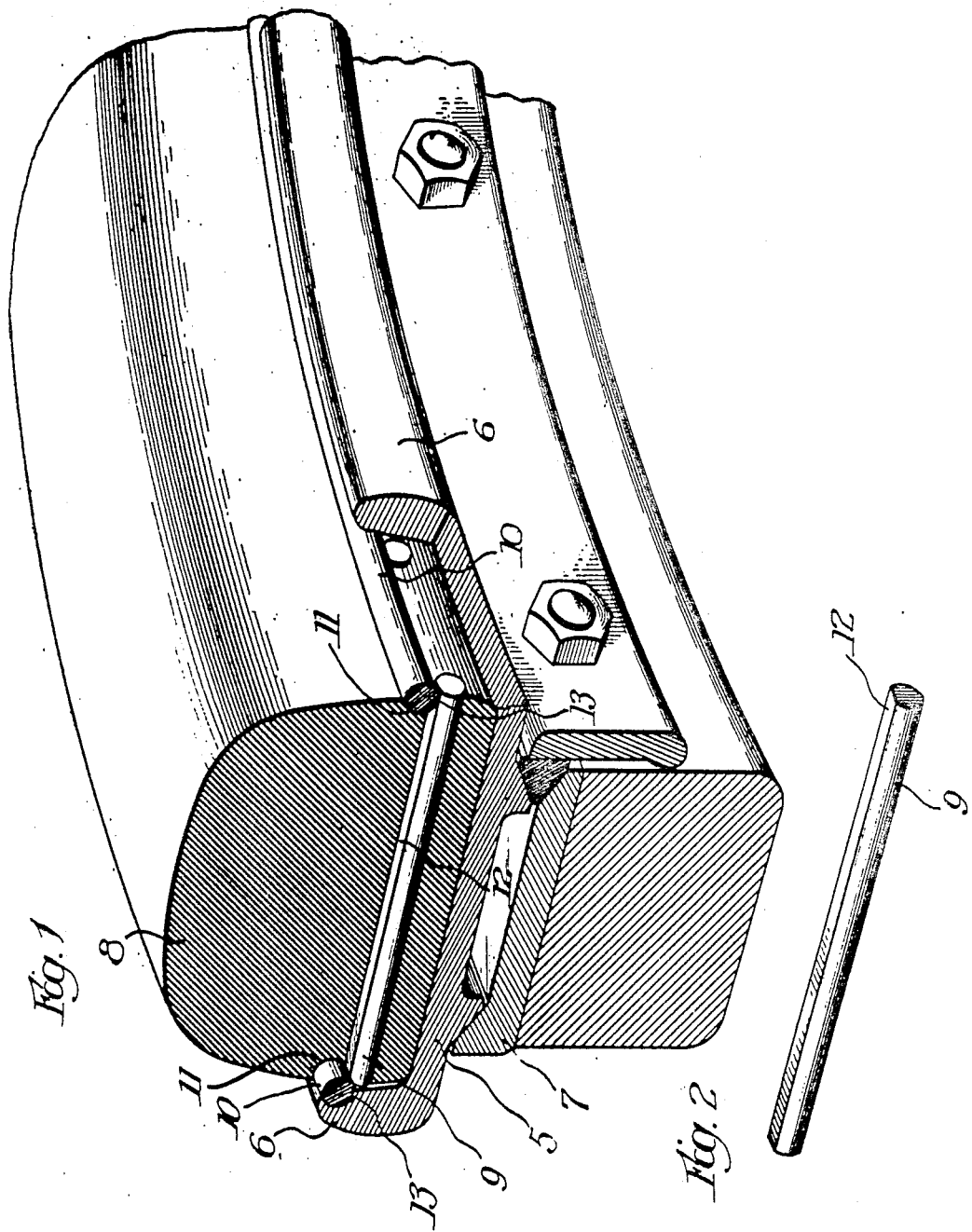

UNITED STATES PATENT OFFICE.

HARVEY S. FIRESTONE, OF AKRON, OHIO, ASSIGNOR TO THE FIRESTONE TIRE & RUBBER COMPANY, OF AKRON, OHIO, A CORPORATION OF OHIO.

SIDE-WIRE TIRE.

1,058,358.  Specification of Letters Patent.  Patented Apr. 8, 1913.

Application filed January 30, 1911. Serial No. 605,526.

*To all whom it may concern:*

Be it known that I, HARVEY S. FIRESTONE, a citizen of the United States, residing at Akron, in the county of Summit and State of Ohio, have invented certain new and useful Improvements in Side-Wire Tires, of which the following is a specification.

My invention relates to side wire tires and refers particularly to the shape of side wires and the cross rods coöperating therewith.

I am aware that in order to retain a tire within its metal tire rim, side wires have heretofore been used in connection with cross rods, but both the side wires and the cross rods have been made round in cross section. As a result the contacts between the side wires and cross rods have theoretically been mere points and in order to prevent the side wires from rolling laterally from the tire rim, it has been necessary to make the flanges on said rims of considerable height. In constructions of this kind, too, there is a tendency for the side wire and cross rod to rub on one another and wear away, particularly when the surfaces of contact are relatively small.

It is the object of my invention to avoid all of these difficulties by making both the cross rods and the side wires with flat contacting surfaces thereon with the result that considerable contacting surfaces are obtained between each of the cross rods and the side wires which engage said rods. In this way the tendency of the side wires to become displaced laterally is avoided and it is thus possible to make the flanges of the tire rim considerably lower than was formerly the case. Also, the wear between the side wires and cross rods is considerably reduced because of the increased contacting surfaces. These and other advantages of my invention will be more readily understood by reference to th accompanying drawings which represent a preferred form of my improvement, and in which—

Figure 1 is a perspective and partly transverse sectional view showing a portion of a tire held in position within the tire rim by means of the coöperating action of the cross rods and side wires, this rim also being shown as held in position on the felly of the wheel. Fig. 2 is a perspective of one of the cross rods.

The tire rim 5, having the outwardly extending flanges 6, is held in position on the felly rim 7 in any suitable manner. Passing through the tire 8 is a plurality of cross rods 9, each of which is engaged on its ends by the side wires 10, which preferably occupy positions in the grooves 11 in the sides of the tire 8. Each of the cross rods 9 has a flat upper surface 12 which is engaged by a corresponding surface 13 on the bottom of each of the side wires 10. It will be apparent that the side wires 10 are located just inside of the flanges 6, and, on account of the engagement of the flat surfaces 12 of the cross rods 9 by the flat surfaces 13 of the side wires 10, the tendency of the side wires to roll outwardly in a lateral direction is counteracted, and it is necessary to make the flanges 6 of a height only approximately equal to the upper or outer portions of the peripheries of said side wires. This is a point of great advantage inasmuch as the edges of the flanges 6 on the lower side of the wheel thus occupy positions much farther removed from the ground than is the case in the old construction.

It is well understood that in constructions of this kind there is a tendency for the tire immediately in front of its point of contact with the ground to crowd forwardly, and that after that part of the tire passes the point of contact with the ground the rubber has a chance to react and readjust itself, the result being that the cross rods and side wires rub upon each other. The prevention of all but a minimum of wear of these parts through the large contacting areas provided is an important feature of this invention.

It will be apparent to those skilled in the art that considerable change could be made in the detailed construction of the parts which I have described without departing from the spirit or scope of my invention.

What I claim is:

The combination of a tire rim, a resilient tire thereon, and means for reinforcing and fastening the tire on the rim comprising a plurality of rods passing transversely through the base portion of the tire, said rods being rounded for the major portion thereof including their under surfaces which are disposed toward the rim, the upper surface of each rod being flattened to prevent turning of the rod in the tire, and the ends of the rods projecting outwardly beyond the opposite edges of the base portion of the tire to constitute exposed upper flat bearing surfaces, and retaining rings passing around the opposite sides of the tire each having the major portion thereof rounded including its inner surface which is disposed toward the tire, and its under surface being continuously flat to bear directly upon the correspondingly flat extended upper bearing surfaces of the transverse rods, to secure the base portion of the tire between said transverse rods and the tire rim while permitting a free slidable relation to exist between the retaining rings and transverse rods both circumferentially and transversely of the rim.

HARVEY S. FIRESTONE.

Witnesses
A. G. PARTRIDGE,
V. M. GREER.

---

Copies of this patent may be obtained for five cents each, by addressing the "Commissioner of Patents, Washington, D. C."